US010683886B2

(12) United States Patent
Schweinberg et al.

(10) Patent No.: US 10,683,886 B2
(45) Date of Patent: Jun. 16, 2020

(54) INTERCHANGEABLE INSERT

(71) Applicant: OLDCASTLE INFRASTRUCTURE, INC., Atlanta, GA (US)

(72) Inventors: F. Matthew Schweinberg, Knoxville, TN (US); Jeff S. Zager, Loudon, TN (US); Ross Jette, Lenoir City, TN (US); Johnny M. Bishop, Englewood, TN (US); Robert E. Hughes, Sweetwater, TN (US)

(73) Assignee: OLDCASTLE INFRASTRUCTURE, INC., Atlanta, GA (US)

( * ) Notice: Subject to any disclaimer, the term of this patent is extended or adjusted under 35 U.S.C. 154(b) by 107 days.

(21) Appl. No.: 15/882,414

(22) Filed: Jan. 29, 2018

(65) Prior Publication Data
US 2019/0234444 A1 Aug. 1, 2019

(51) Int. Cl.
*F16B 37/00* (2006.01)
*F16B 37/04* (2006.01)

(52) U.S. Cl.
CPC ............ *F16B 37/04* (2013.01); *F16B 37/044* (2013.01)

(58) Field of Classification Search
CPC .................................................... F16B 37/044
USPC ........................................................ 411/104
See application file for complete search history.

(56) References Cited

U.S. PATENT DOCUMENTS

| | | | | | |
|---|---|---|---|---|---|
| 2,649,126 | A | * | 8/1953 | Tinnerman | F16B 37/044 411/113 |
| 4,886,407 | A | * | 12/1989 | Harbin | F16B 37/047 411/104 |
| 4,934,886 | A | * | 6/1990 | Aikens | B25B 31/00 29/453 |
| 5,193,643 | A | * | 3/1993 | McIntyre | B60G 99/00 180/312 |
| 5,605,353 | A | * | 2/1997 | Moss | B62D 21/09 188/376 |
| 5,779,412 | A | * | 7/1998 | Nagai | E04B 2/766 411/85 |
| 5,947,518 | A | * | 9/1999 | Redman | F16B 37/044 280/781 |
| 6,146,071 | A | * | 11/2000 | Norkus | F16B 37/044 296/187.09 |

* cited by examiner

*Primary Examiner* — Gary W Estremsky
(74) *Attorney, Agent, or Firm* — Kilpatrick Townsend & Stockton LLP (57) ABSTRACT

Interchangeable inserts are disclosed for use in enclosures, such as underground enclosures. The interchangeable inserts include insert bodies that are configured to house standalone nuts and nuts contained within removable trays.

17 Claims, 11 Drawing Sheets

INTERCHANGEABLE INSERT

BACKGROUND

The present invention relates generally to fastener inserts in enclosures and more particularly to interchangeable inserts for underground enclosures.

Enclosures, such as underground enclosures, may include inserts molded into the enclosure to house fasteners, such as nuts. The nuts may be used with bolts to fasten objects to the enclosures, such as enclosure lids. Purchasers of the underground enclosures may require manufacturers of the enclosures to include replaceable inserts in the enclosures. Inserts may need to be replaced in order to change the size of a nut within the enclosure or to replace a damaged nut within the enclosure. However, it can be very difficult to replace or change the size of the inserts once the inserts are installed in an enclosure. New enclosures may need to be purchased to change the nut within the inserts.

SUMMARY

In one embodiment, an interchangeable insert comprises a tray and an insert body. The tray comprises an interior space configured to contain a first size of a threaded nut; and a first tray opening located at a top of the tray, wherein the first tray opening is configured to allow a portion of a bolt into the tray interior space. The insert body is designed to be included in an enclosure, wherein the insert body comprises a first compartment configured to securely contain the tray, wherein the first compartment is configured to contain a second size of a threaded nut without the tray, wherein the first size threaded nut is smaller than the second size threaded nut; a top wall with a first opening providing access to the first compartment, wherein the first opening is configured to allow a portion of a bolt into the first compartment; and a second opening in a side of the insert body, wherein the second opening is configured to allow the tray to enter the first compartment after the insert body is included in the enclosure.

In another embodiment, a method of switching a first size threaded nut for a second size threaded nut in an interchangeable insert is disclosed. The interchangeable insert comprises an insert body designed to be included in an enclosure, wherein the insert body comprises a first compartment configured to securely contain a tray containing the first size threaded nut, wherein the first compartment is configured to contain the second size threaded nut without the tray, wherein the first size threaded nut is smaller than the second size threaded nut; an opening in a side of the insert body, wherein the opening is configured to allow the tray to enter the first compartment after the insert body is included in the enclosure; and a door to close the insert body first compartment. The method comprises opening the door to expose the insert body first compartment; removing the tray containing the first size threaded nut threaded nut from the insert body first compartment; inserting the second size threaded nut into the insert body first compartment; and shutting the door to close the insert body first compartment.

In another embodiment, a method of switching a second size threaded nut for a first size threaded nut in an interchangeable insert is disclosed. The interchangeable insert comprises an insert body designed to be included in an enclosure, wherein the insert body comprises a first compartment configured to securely contain a tray containing the first size threaded nut, wherein the first compartment is configured to contain the second size threaded nut without the tray, wherein the first size threaded nut is smaller than the second size threaded nut; an opening in a side of the insert body, wherein the opening is configured to allow the tray to enter the first compartment after the insert body is included in the enclosure; and a door to close the insert body first compartment. The method comprises opening the door to expose the insert body first compartment; removing the second size threaded nut from the insert body first compartment; inserting the tray containing the first size threaded nut into the insert body first compartment; and shutting the door to close the insert body first compartment.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
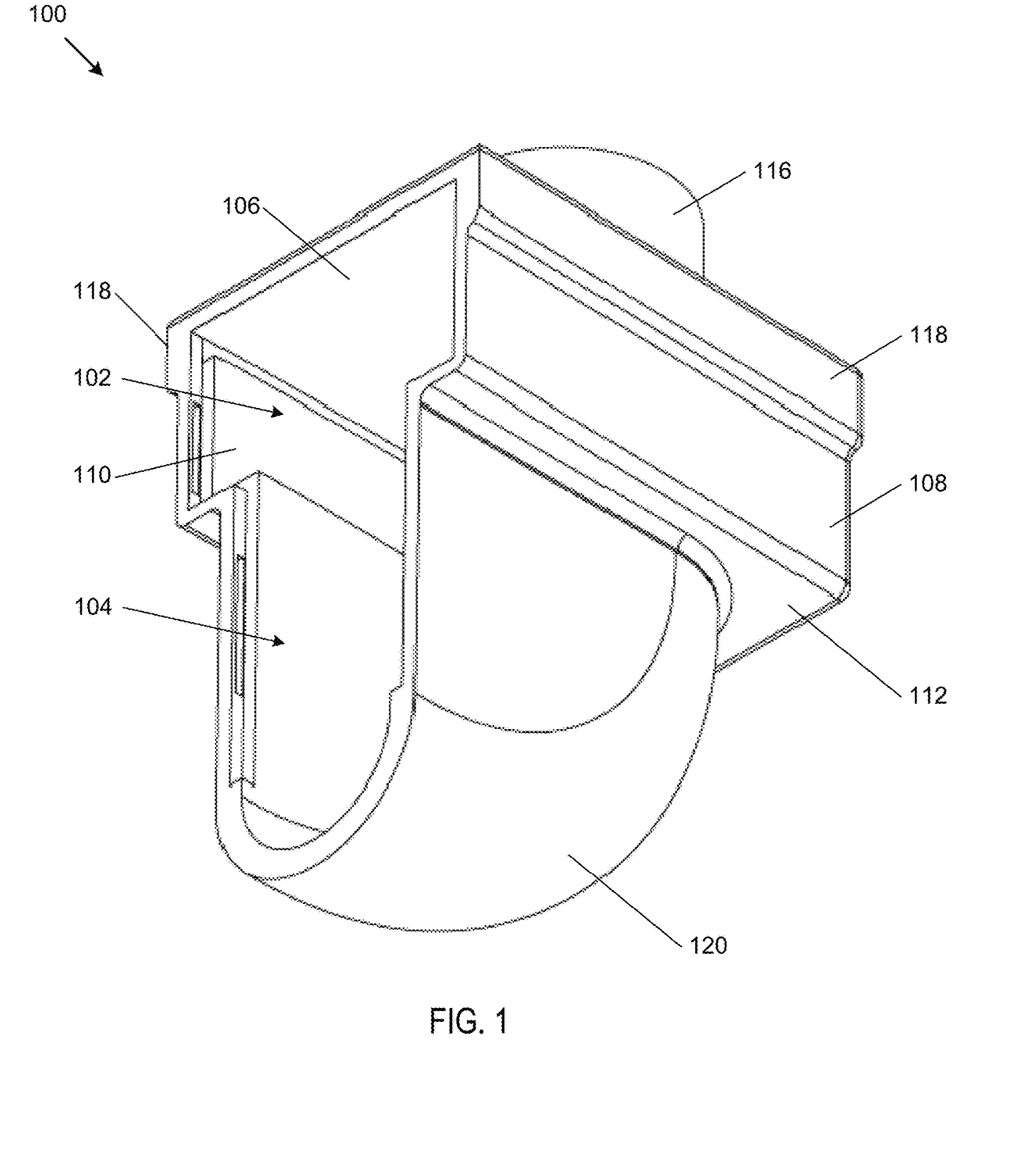
FIG. 1 is an isometric view of a interchangeable insert body according to a first embodiment of this disclosure.

Referring to the figures, FIG. 1 shows an isometric view of an embodiment of an interchangeable insert body 100 for use in an interchangeable insert. Interchangeable insert body 100 may be designed to be installed in an underground enclosure, such as a polymer concrete enclosure. The interchangeable insert body 100 may, for example, be molded into a polymer concrete enclosure as the enclosure is formed.

Interchangeable insert body 100 may include a first compartment 102 and a second compartment 104. The first compartment 102 may be configured to contain a nut 1274 (shown in FIG. 13). Nut 1274 may be any type or size of nut, such as a ½ inch square threaded nut. Nut 1274 may have any thread configuration or size and can be made from a variety of materials, such as brass, stainless steel or zinc plated steel.

The first compartment 102 and the second compartment 104 may be joined together such that an object, such as a bolt, may pass from the first compartment 102 to the second compartment 104. The first compartment 102 may extend the entire length of interchangeable insert body 100. The second compartment 104 may only extend part of the length of interchangeable insert body 100, as shown in FIG. 1, or the second compartment 104 may extend the entire length of interchangeable insert body 100.

The first compartment 102 may include a top wall 106 and opposed side walls 108, 110 and bottom wall 112. Top wall 106 may include an opening 114 (shown in FIG. 4) that allows objects, such as a bolt, to enter the first compartment 102 and the second compartment 104. Opening 114 may be surrounded by a collar 116 that extends away from an exterior portion of top wall 106. Collar 116 may aid in guiding a bolt into opening 114 and may keep opening 114 clear as interchangeable insert body 100 is molded into the enclosure.

Figure 7:
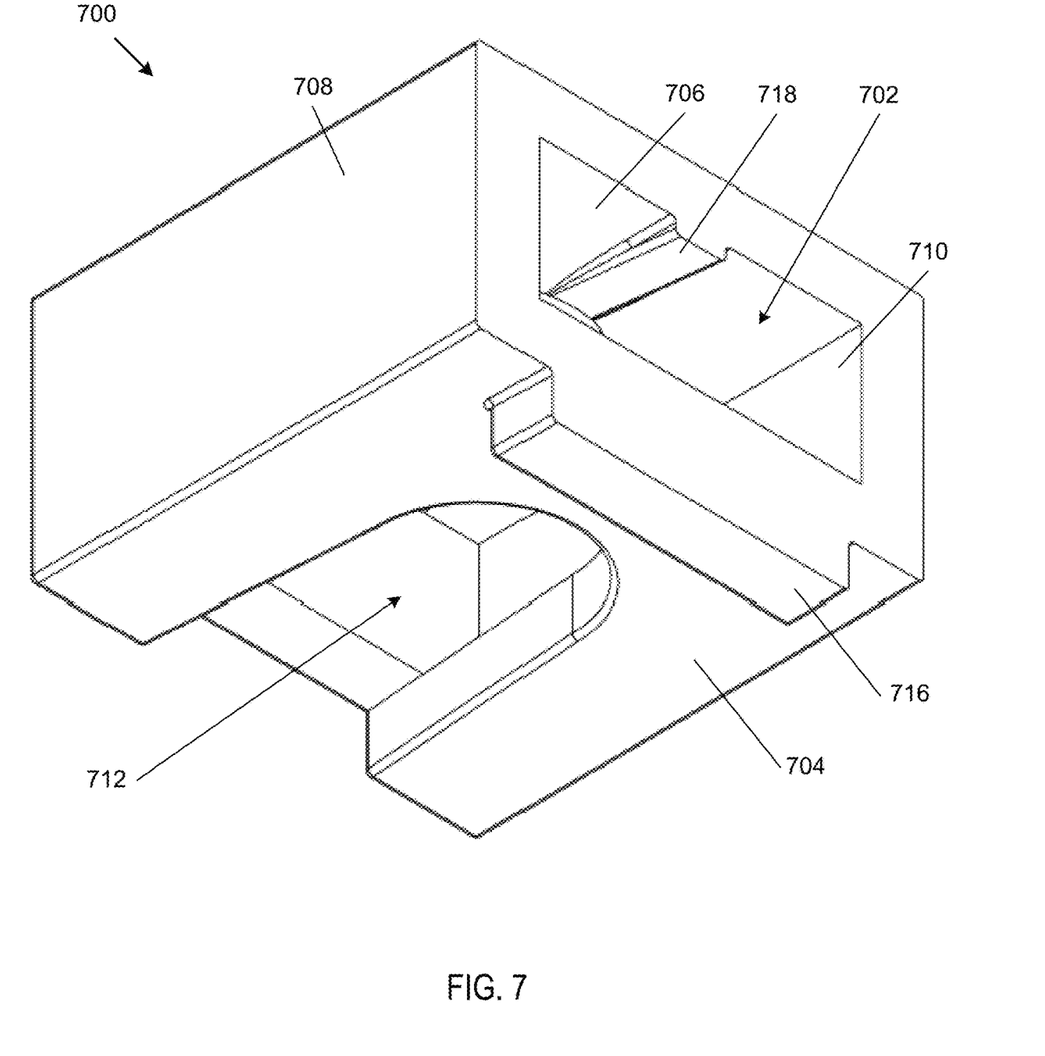
FIG. 7 is an isometric view of a tray according to a first embodiment of this disclosure.

The first compartment 102 may be configured to contain a tray 700 (shown in FIG. 7). The first compartment 102 may be sized such that the tray 700 fits securely within the first compartment 102. Tray 700 may be able to be easily inserted into the first compartment 102, but there may not be excessive space between the outside of tray 700 and the inside of the first compartment 102. For example, an interior width of the first compartment 102 may be 0.947 inches and an exterior width of tray 700 may be 0.900 inches.

A ridge 118 may extend from side walls 108, 110 near where side walls 108, 110 connect with top wall 106. Ridge 118 may extend the entire length of interchangeable insert body 100, as shown in FIG. 1, or ridge 118 may only extend part of the length of interchangeable insert body 100.

A section of the second compartment 104 that is located away from the first compartment may have a curved end 120. When installed in an enclosure, curved end 120 may collect and channel liquid, such as groundwater, that has entered interchangeable insert body 100. The liquid may exit the interchangeable insert body 100 at the bottom of curved end 120.

For clarity, FIGS. 2-6 may show interchangeable insert body 100 in a position that is inverted from how interchangeable insert body 100 would be installed in an enclosure. The dimensions shown in FIGS. 2-6 are in inch units and are exemplary.

Figure 2:
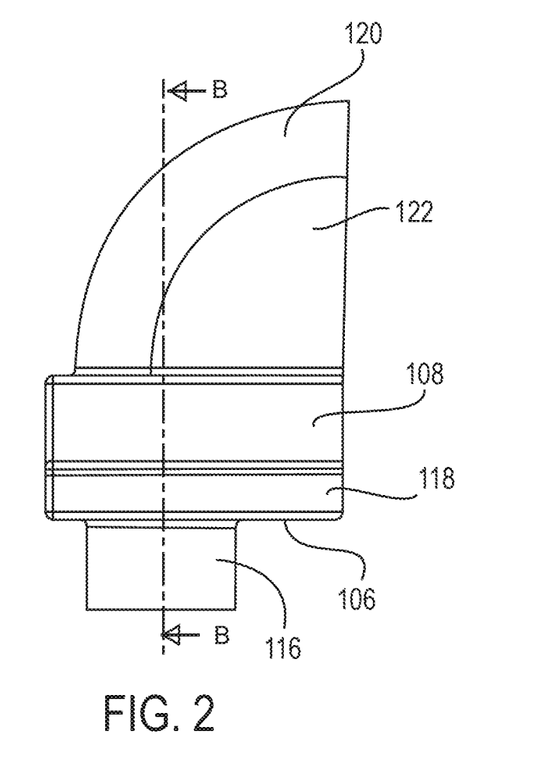
FIG. 2 is a side view of a interchangeable insert body according to the first embodiment of this disclosure.

FIG. 2 shows a side view of interchangeable insert body 100. FIG. 2 shows side wall 108 of the first compartment 102 with ridge 118 on sidewall 108. FIG. 2 also shows curved end 120 of the second compartment 104. FIG. 2 shows that a front face 122 of interchangeable insert body 100 may include one degree of draft such that front face 122 is not exactly vertical in relation to top wall 106. The draft on front face 122 may aid in removing interchangeable insert body 100 from a mold in the event interchangeable insert body 100 is manufactured using a mold. Collar 116 is shown extending away from an exterior portion of top wall 106.

Figure 3:
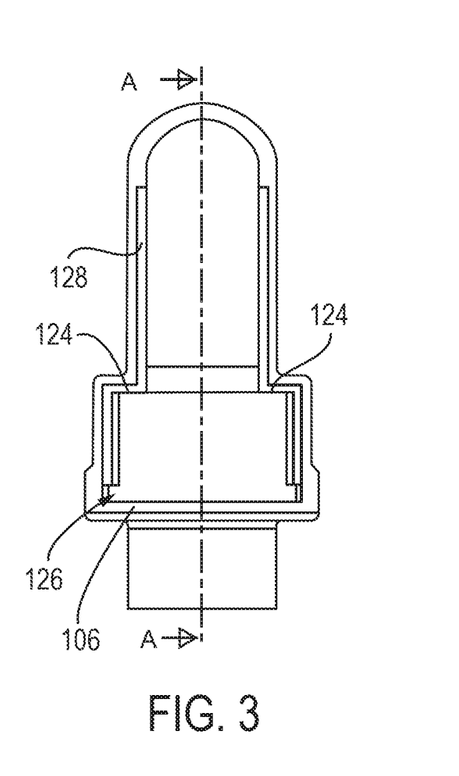
FIG. 3 is an front view of a interchangeable insert body according to the first embodiment of this disclosure.

FIG. 3 shows a front view of interchangeable insert body 100. FIG. 3 shows that the width of the first compartment 102 may be larger than the width of the second compartment 104. For example, the interior width of the first compartment 102 may be 0.947 inches whereas the interior width of the second compartment 104 may be 0.625 inches. The relatively smaller width of the second compartment 104 may provide a shelf area 124 to support tray 700 when tray 700 is within the first compartment 102.

Interchangeable insert body 100 may include a slot 126 configured to contain a washer 1272 (shown in FIGS. 12 and 13) within the first compartment 102. Slot 126 may hold the washer near top wall 106 of the first compartment 102.

Figure 11A:
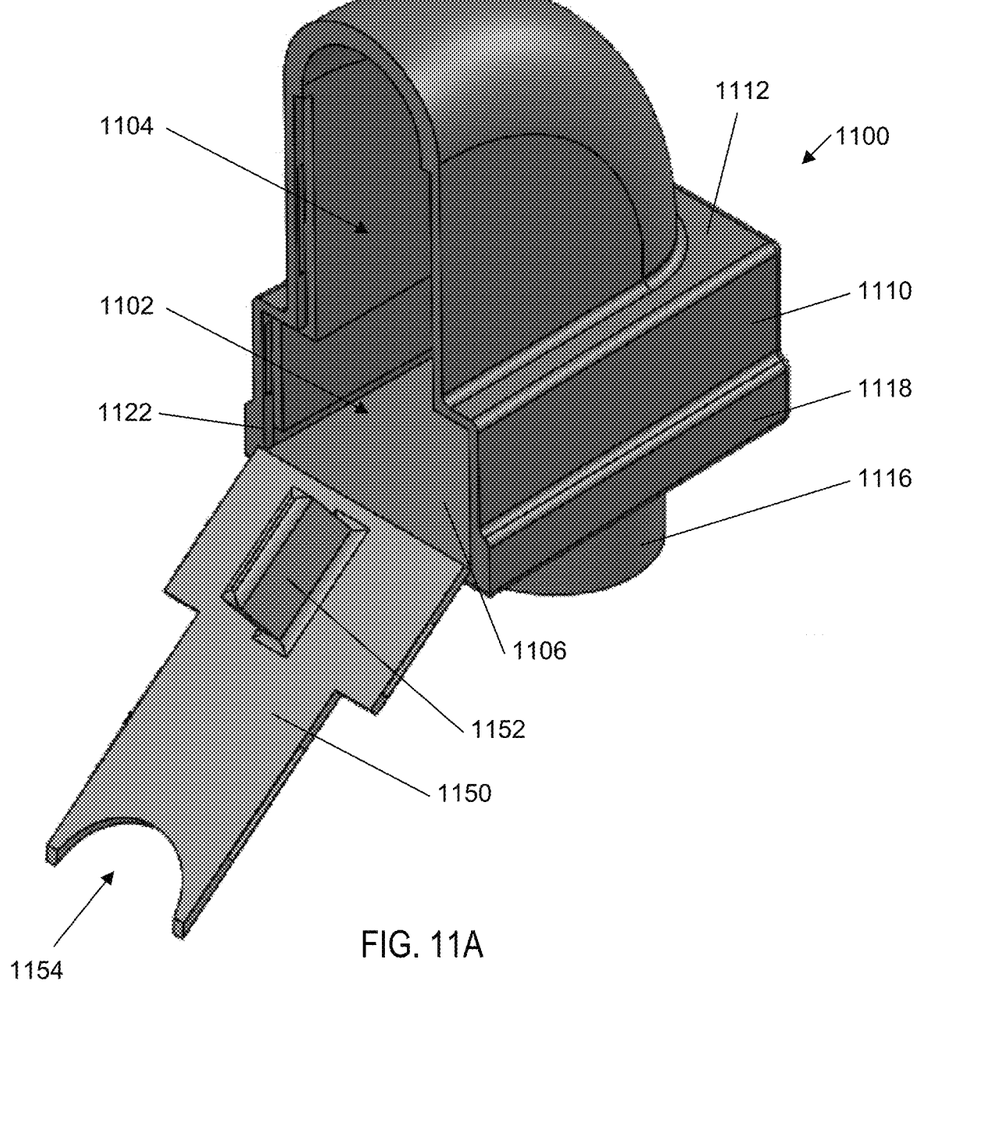
FIG. 11A is an isometric view of an interchangeable insert body and a door according to a second embodiment of this disclosure.

FIG. 3 shows that interchangeable insert body 100 may include an indentation 128 surrounding an interior edge of the first compartment 102 and the second compartment 104. For example, the indentation 128 may be 0.050 inches, as shown in FIG. 3. The indentation 128 may allow a door 1150 (shown in FIG. 11) to fit flushly within front face 122 of interchangeable insert body 100.

Figure 4:
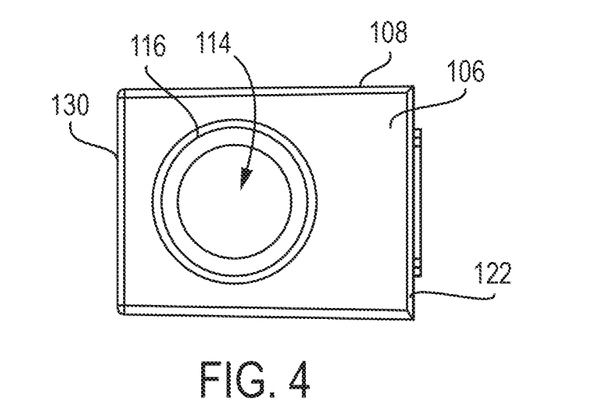
FIG. 4 is a top view of a interchangeable insert body according to the first embodiment of this disclosure.

FIG. 4 shows a top view of interchangeable insert body 100. FIG. 4 show collar 116 extending from an exterior portion of top wall 106. FIG. 4 shows sidewalls 108, 110 may include one degree of draft such that the width of front face 122 is larger than the width a back wall 130. For example, the width of front face 122 may be 1.300 inches and the width of back wall 130 may be 1.244 inches. The draft on sidewalls 108, 110 may aid in removing interchangeable insert body 100 from a mold in the event interchangeable insert body 100 is manufactured using a mold.

Figure 5:
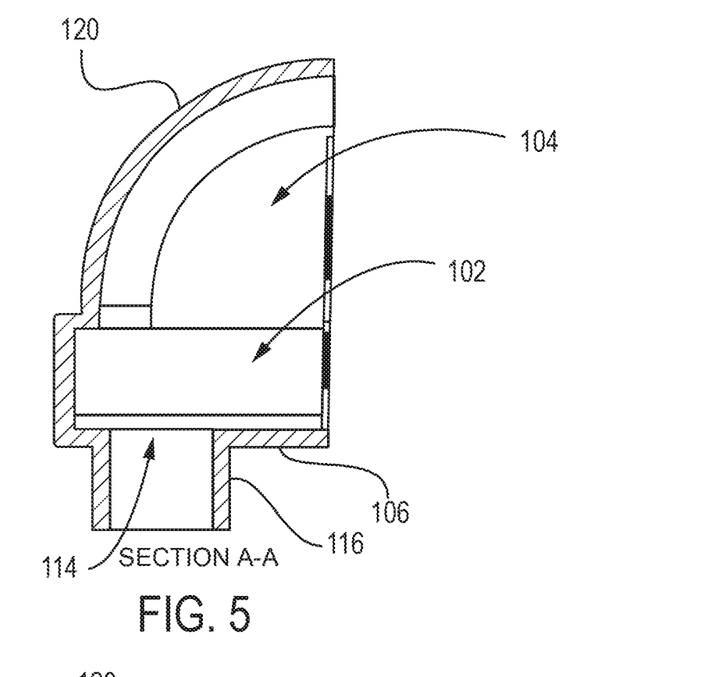
FIG. 5 is a sectional side view of a interchangeable insert body according to the first embodiment of this disclosure.

FIG. 5 shows a cross-section side view of interchangeable insert body 100 through Section A-A from FIG. 3. FIG. 5 shows the first compartment 102 with top wall 106 and opening 114. Collar 116 is shown surrounding opening 114. FIG. 5 shows the second compartment 104 with curved end 120.

Figure 6:
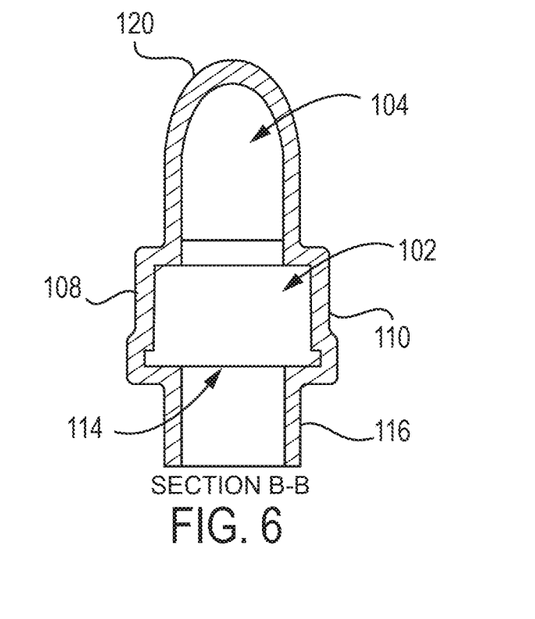
FIG. 6 is a sectional front view of a interchangeable insert body according to the first embodiment of this disclosure.

FIG. 6 shows a cross-section end view of interchangeable insert body 100 through Section B-B from FIG. 2. FIG. 6 shows the first compartment 102, side walls 108, 110, opening 114, collar 116, and curved end 120.

FIG. 7 shows an isometric view of an embodiment of a tray 700 for use in an interchangeable insert. Tray 700 may be installed in an interchangeable insert body, such as interchangeable insert body 100. Tray 700 may be made of any material that will not deteriorate when place in the ground, such as certain types of plastics or polymers. Tray 700 may be configured to contain a nut 1270 (shown in FIG. 12). Nut 1270 may be any type or size of nut, such as a ⅜ inch square threaded nut. Nut 1270 may have any thread configuration or size and can be made from a variety of materials, such as brass, stainless steel or zinc plated steel.

Tray 700 may include slot 702 to contain nut 1274. Slot 702 may be defined by tray bottom 704, tray top 706, and opposed tray side walls 708, 710. Tray 700 may include opening 712. Tray bottom 704 may include opening 712 that allows objects, such as a bolt, to enter tray 700. Tray top 706 may include opening 714 (shown in FIG. 10) that allows objects, such as a bolt, to pass through tray 700. For example, when tray 700 is within first compartment 102, a bolt may enter first compartment 102 through opening 114 and pass through tray 700 through openings 712, 714, including any nut contained within tray 700, and enter second compartment 104. Opening 714 may be similarly shaped and located as opening 712.

Tray 700 may include an alignment protrusion 716. Alignment protrusion 716 may extend from tray bottom 704. Alignment protrusion 716 may not extend the entire width of tray 700, as shown in FIG. 7. Alignment protrusion 716 may fit securely within second compartment 104 or a space between first compartment 102 and second compartment 104 when tray 700 is within the first compartment 102. Accordingly, the width of alignment protrusion 716 may be similar to the width of second compartment 104. Alignment protrusion 716 may help align tray 700 within first compartment 102 such that tray 700 may only fit into first compartment 102 in a particular orientation.

Tray 700 may include ramp 718 within slot 702. Ramp 718 may be configured to help keep nut 1270 within tray 700. Ramp 718 may taper from a relative high point at the entrance of slot 702 such that nut 1270 is urged away from the entrance of slot 702. Ramp 718 may keep nut 1270 in contact, at least partially, with tray bottom 704. Tray 700 may include another ramp located on tray bottom 704 opposite ramp 718 in slot 702.

Figure 8:
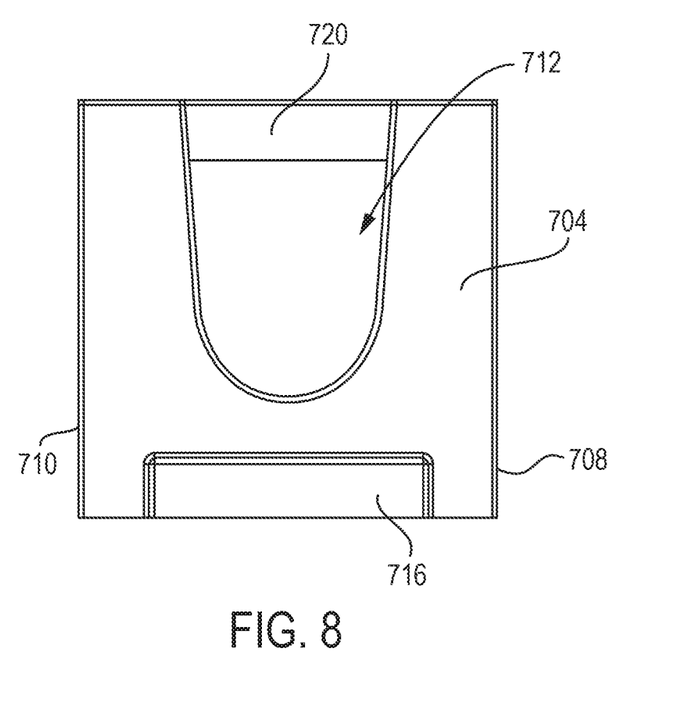
FIG. 8 is a bottom view of a tray according to the first embodiment of this disclosure.
Figure 9:
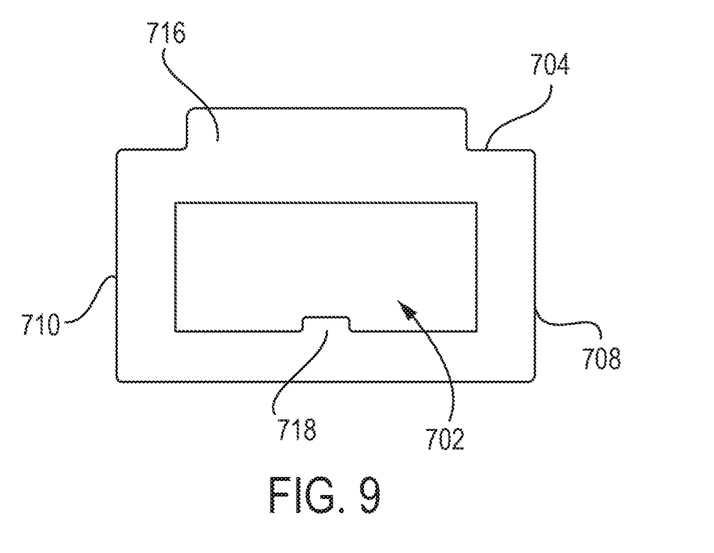
FIG. 9 is a front view of a tray according to the first embodiment of this disclosure.
Figure 10:
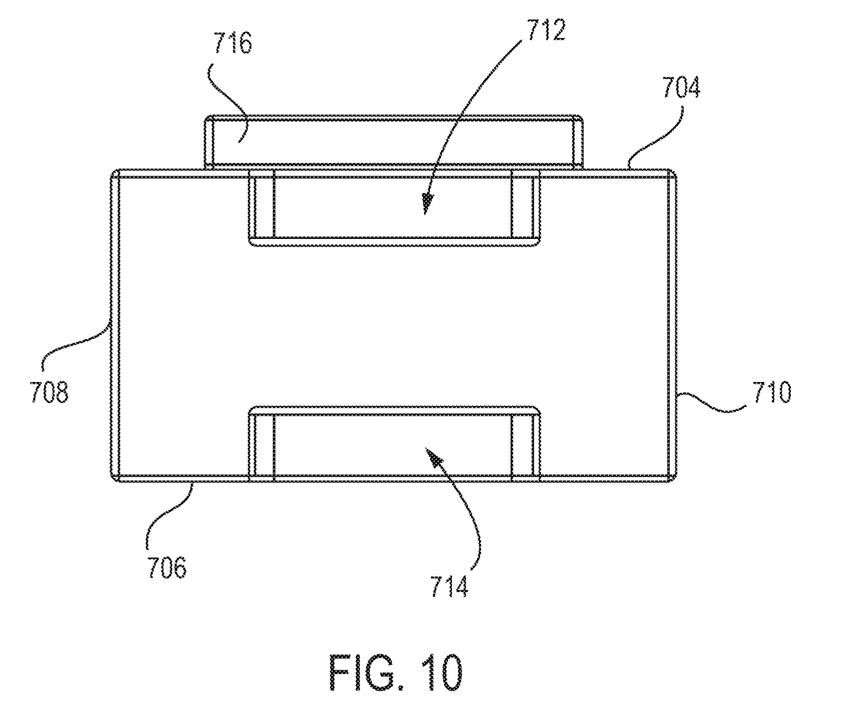
FIG. 10 is a back view of a tray according to the first embodiment of this disclosure.

For clarity, FIGS. 8-10 may show tray 700 in a position that is inverted from how tray 700 would be installed in an interchangeable insert body. The dimensions shown in FIGS. 8-10 are in inch units and are exemplary.

FIG. 8 shows a bottom view of tray 700. FIG. 8 shows that opening 712 may have a circular arch shape on one end near the center of tray bottom 704. Opening 712 may extend outward toward a back surface of tray 700 from the center of tray bottom 704. The edge 720 of opening 712 at the back surface of tray 700 may be wider than the opposite circular arch shape end of opening 712. Opening 714 may have the same shape and characteristics as opening 712.

FIG. 9 shows a front end view of tray 700. FIG. 9 shows alignment protrusion 716 extending from tray bottom 704. FIG. 9 shows the high point of ramp 718 at the entrance of slot 702.

FIG. 10 shows a back end view of tray 700. FIG. 10 shows opening 714 on the opposite end of tray 700 than opening 712. FIG. 10 shows alignment protrusion 716 extending from tray bottom 704.

Figure 11B:
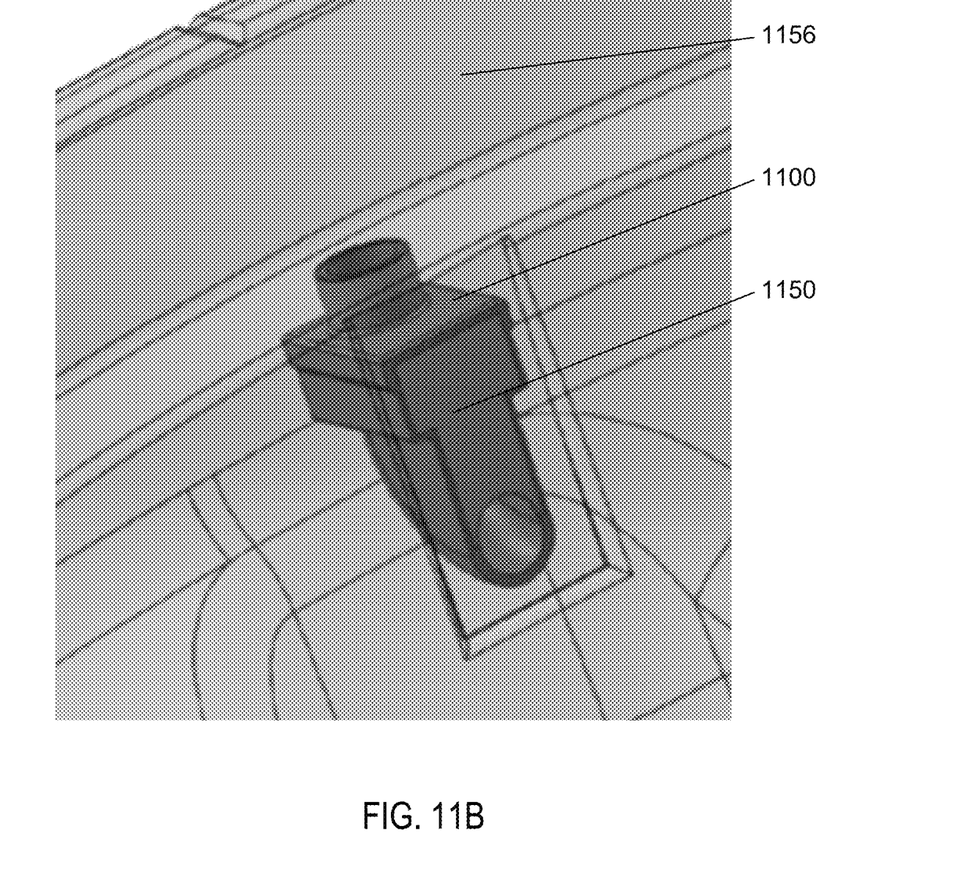
FIG. 11B is an isometric view of an interchangeable insert body and a door installed in an enclosure according to the second embodiment of this disclosure.

FIGS. 11A and 11B show another embodiment of an interchangeable insert with interchangeable insert body 1100 and door 1150. FIG. 11A shows interchangeable insert body 1100 and door 1150 prior to installation in an enclosure. For clarity, FIG. 11A may show interchangeable insert body 1100 and door 1150 in a position that is inverted from how interchangeable insert body 1100 and door 1150 would be installed in an enclosure. FIG. 11B shows interchangeable insert body 1100 with door 1150 installed in an enclosure 1156. Enclosure 1156 is shown as partially transparent in FIG. 11B in order to show interchangeable insert body 1100 within enclosure 1156. Enclosure 1156 may be any type of enclosure, such as a molded polymer concrete enclosure designed for underground service.

Interchangeable insert body 1100 may include some or all of the features and components as interchangeable insert body 100, such as first compartment 1102, second compartment 1104, top wall 1106, side walls 1108, 1110, bottom wall 1112, opening 1114, collar 1116, ridge 1118, curved end 1120.

Door 1150 may have the same shape as front face 1122 of interchangeable insert body 1100. Door 1150 may be configured to partially or fully cover front face 1122 of interchangeable insert body 1100. Door 1150 may be connected, such as by a hinge, to interchangeable insert body 1100, such that door 1150 swings to cover or uncover the opening formed in front face 1122.

Door 1150 may include projection 1152 that extends from a surface of door 1150. Projection 1152 may extend into the interior of interchangeable insert body 1100 when door 1150 has closed the opening formed in front face 1122. Projection 1152 may restrict the space for a tray, such as tray 700, to move within first compartment 1102 when the tray is within first compartment 1102. Projection 1152 may be rectangular, as shown in FIG. 11A, or may be any other shape sufficient to extend into first compartment 1102 and restrict the movement of a tray within first compartment 1102.

Door 1150 may include opening 1154. Opening 1154 in door 1150 may allow door 1150 to be opened by inserting an object, such as a finger or tool, into opening 1154 and using the object to pull door 1150 open. Opening 1154 may also allow liquid to drain from the interior of interchangeable insert body 1100 when interchangeable insert body 1100 is installed in an enclosure. Opening 1154 may be any shape that aids in opening door 1154 and/or allows liquid to drain from interchangeable insert body 1100.

Figure 12:
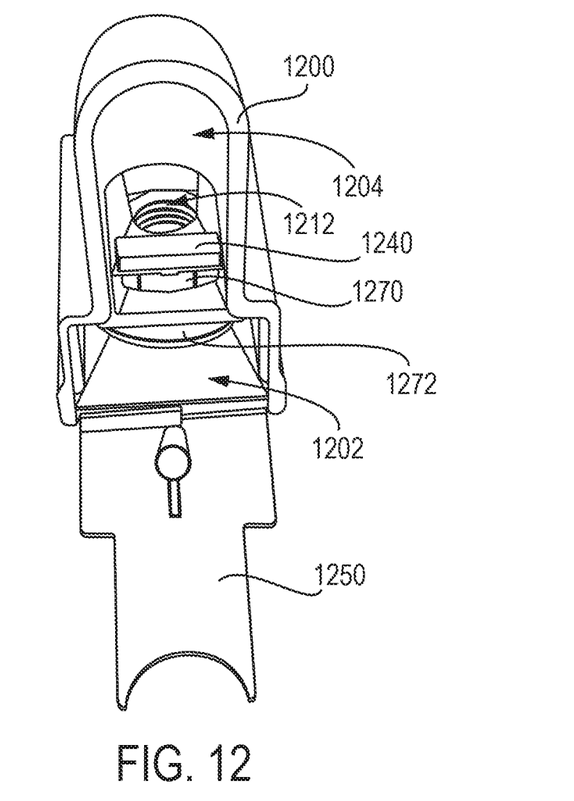
FIG. 12 is a picture of an interchangeable insert body, a tray, and a door according to a third embodiment of this disclosure.
Figure 13:
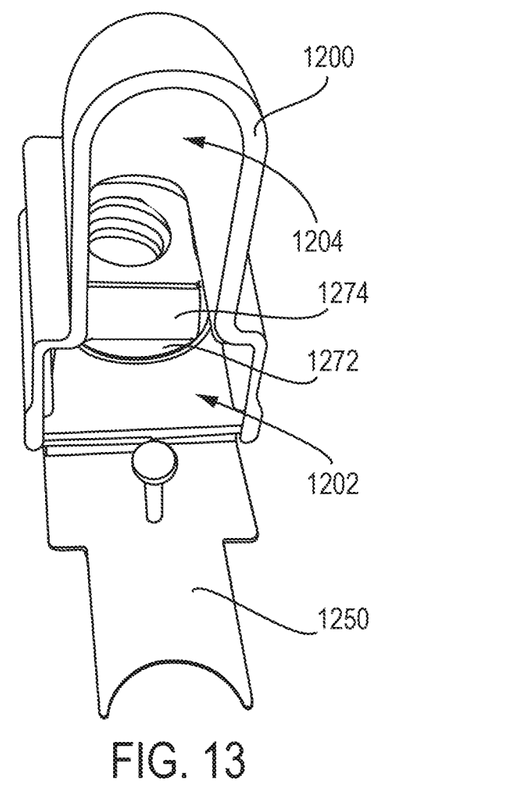
FIG. 13 is a picture of an interchangeable insert body and a door according to the third embodiment of this disclosure.
Figure 14:
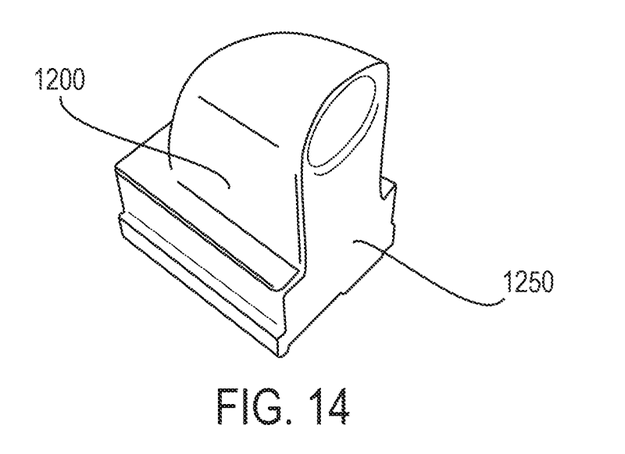
FIG. 14 is another picture of an interchangeable insert body and a door according to the third embodiment of this disclosure.

FIGS. 12-14 show another embodiment of an interchangeable insert with interchangeable insert body 1200, tray 1240, and door 1250. FIGS. 12-14 may show interchangeable insert body 1200, tray 1240, and door 1250 positions that are inverted from how interchangeable insert body 1200, tray 1240, and door 1250 would be installed in an enclosure.

Interchangeable insert body 1200 may include some or all of the features of interchangeable insert body 100; accordingly, the description of the features of interchangeable insert body 100 described above apply to interchangeable insert body 1200 and will not be repeated. Tray 1240 may include some or all of the features of tray 700; accordingly, the description of the features of tray 700 described above apply to tray 1240 and will not be repeated. Door 1250 may include some or all of the features of door 1150; accordingly, the description of the features of door 1150 described above apply to door 1250 and will not be repeated.

FIG. 12 shows interchangeable insert body 1200, tray 1240, and door 1250. Door 1250 is open to allow access to the first compartment 1202 and second compartment 1204 of interchangeable insert body 1200. Tray 1240 is located within first compartment 1202. Tray 1240 contains nut 1270. Nut 1270 may be any type or size of nut, such as a ⅜ inch square threaded nut. FIG. 12 shows that opening 1212 in tray 1240 aligns with the threaded opening in nut 1270. A washer 1272 may be located adjacent to tray 1240 in the first compartment 1202.

FIG. 13 shows interchangeable insert body 1200, door 1250, and washer 1272. A nut 1274 is located within first compartment 1202 in FIG. 13. Nut 1274 may be any type or size of nut, such as a ½ inch square threaded nut. Nut 1274 may be larger than nut 1270.

FIG. 14 shows interchangeable insert body 1200 with door 1250 in a closed position. Either tray 1240 with nut 1270, or nut 1272 without a tray may be located within interchangeable insert body 1200 in FIG. 14.

Door 1250 may be opened, as shown in FIGS. 12 and 13, and the nuts within interchangeable insert body 1200 may be removed and switched with other nuts. For example, tray 1240 with nut 1270 in FIG. 12 may be removed from interchangeable insert body 1200 and nut 1274 from FIG. 13 may be placed within interchangeable insert body 1200. In this manner, nut 1270 may be switched with nut 1274 in interchangeable insert body 1200. Such a switch may be done after the interchangeable insert has been installed in an enclosure, before or after the enclosure is installed in the field. The ability to switch nuts after the interchangeable insert has been installed in an enclosure may allow a user flexibility to switch nuts to use a different size nut or to replace a damaged nut without replacing the enclosure or removing the enclosure from service. For example, a user can change from a ⅜ inch-16UNC or ⅜ inch-6 nut to a ½ inch-13UNC or ½ inch-6 coil thread nut or vise-a-versa with standard sized square nuts.

The ability to easily switch nuts in an interchangeable insert that has been installed in an enclosure may also reduce the inventory required to be stocked because the enclosures can be produced with any size nut and the nuts can be switched prior to shipping the enclosures, if they were produced with nut sizes other than what the customer ordered. The inventory reduction will come at the manufacturing site as well as the stocking distributors' locations.

Figure 15:
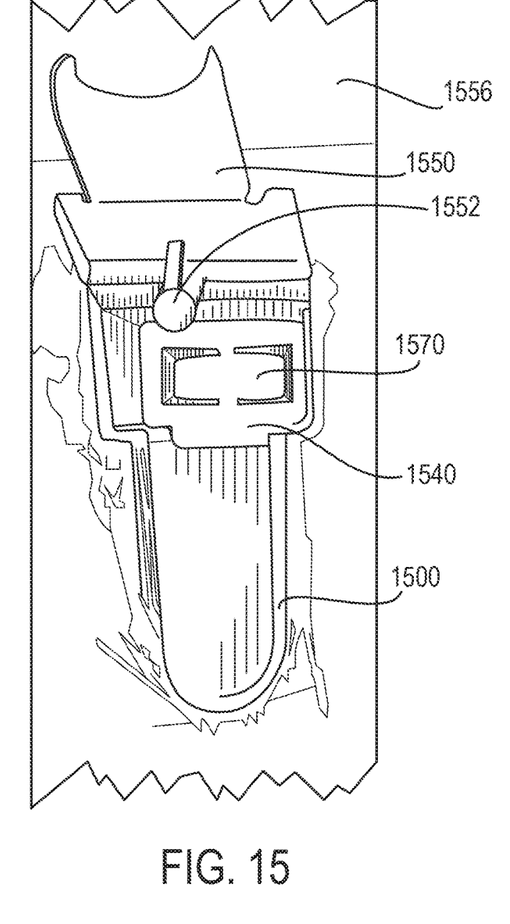
FIG. 15 is a picture of an interchangeable insert body, a tray, and a door installed in an enclosure according to the third embodiment of this disclosure.
Figure 16:
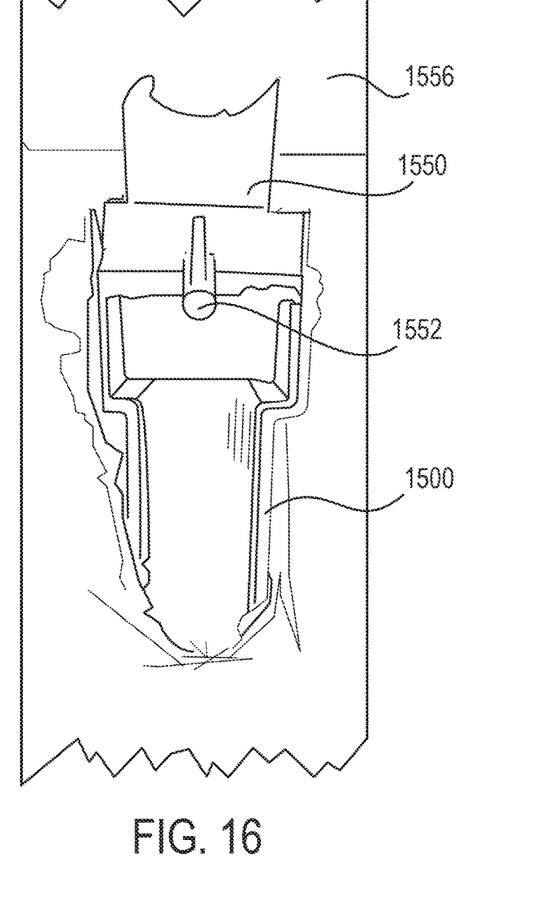
FIG. 16 is a picture of an interchangeable insert body and a door installed in an enclosure according to the third embodiment of this disclosure.
Figure 17:
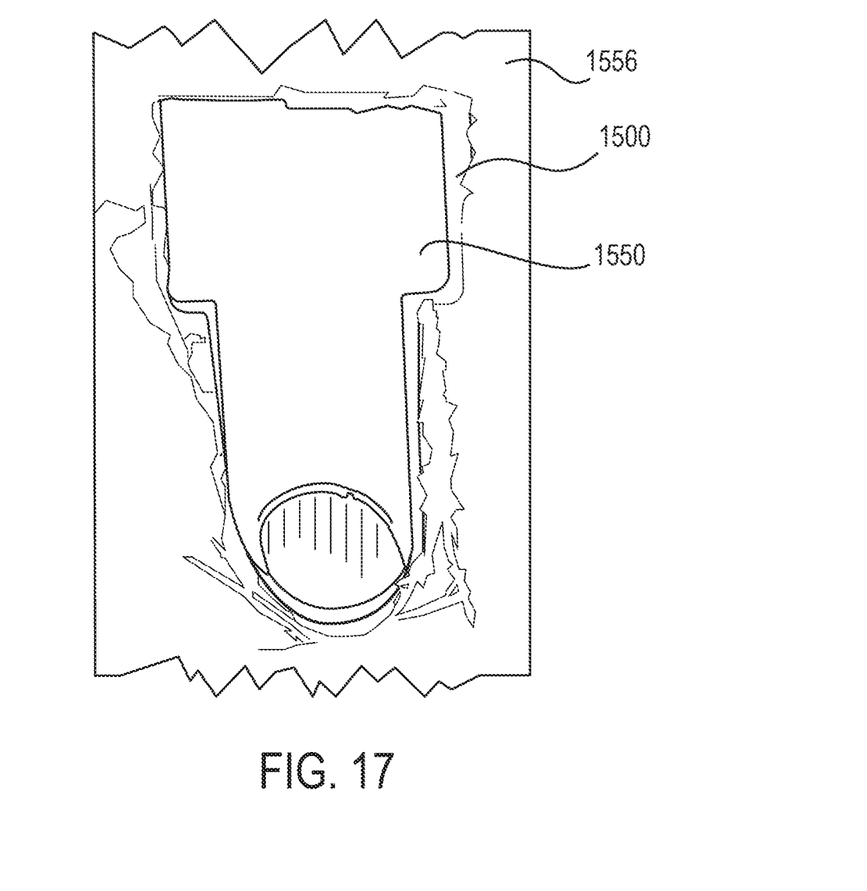
FIG. 17 is another picture of an interchangeable insert body and a door installed in an enclosure according to the third embodiment of this disclosure.

FIGS. 15-17 show another embodiment of an interchangeable insert with interchangeable insert body 1500, tray 1540, and door 1550 installed in an enclosure 1556. Enclosure 1556 may be a molded polymer concrete enclosure designed for underground service. Interchangeable insert body 1500 may include some or all of the features of interchangeable insert body 100; accordingly, the description of the features of interchangeable insert body 100 described above apply to interchangeable insert body 1500 and will not be repeated. Tray 1540 may include some or all of the features of tray 700; accordingly, the description of the features of tray 700 described above apply to tray 1540 and will not be repeated. Door 1550 may include some or all of the features of door 1150; accordingly, the description of the features of door 1150 described above apply to door 1550 and will not be repeated.

FIG. 15 shows tray 1540 with a nut 1570 installed in the first compartment 1502 of interchangeable insert body 1500 with door 1550 in the open position. Projection 1552 on door 1550 may be generally cylindrical shaped with a supporting web in the embodiment in FIG. 15.

FIG. 16 shows interchangeable insert body 1500 with door 1550 in the open position without a tray 1540 containing a nut 1570 and without a nut 1574 located within interchangeable insert body 1500.

FIG. 17 shows interchangeable insert body 1500 with door 1550 in a closed position. Either tray 1540 with nut 1570, or nut 1572 without a tray may be located within interchangeable insert body 1500 in FIG. 17. As described above, door 1550 may be opened, as shown in FIGS. 15 and 16, and nuts within interchangeable insert body 1500 may be removed and switched with other nuts.

While several embodiments of the interchangeable inserts have been described, it should be understood that the interchangeable inserts are not so limited, and modifications may be made without departing from the disclosures herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the interchangeable inserts, and it is not necessarily expected that all of the described advantages will be achieved with every embodiment of the interchangeable insert. The scope of the disclosure is defined by the appended claims, and all devices and methods that come within the meaning of the claims, either literally or by equivalence, are intended to be embraced therein.

The invention claimed is:

1. An interchangeable insert comprising:
a tray comprising:
a tray interior space configured to contain a first size of a threaded nut; and
a first tray opening located at a top of the tray, wherein the first tray opening is configured to allow a portion of a bolt into the tray interior space; and
an insert body designed to be included in an enclosure, wherein the insert body comprises:
a first compartment configured to securely contain the tray, wherein the first compartment is configured to contain a second size of a threaded nut without the tray, wherein the first size threaded nut is smaller than the second size threaded nut;
a top wall with a first opening providing access to the first compartment, wherein the first opening is configured to allow a portion of a bolt into the first compartment;
a second opening in a side of the insert body, wherein the second opening is configured to allow the tray to enter the first compartment after the insert body is included in the enclosure; and
wherein the insert body further comprises a door to close at least the insert body first compartment.

2. The interchangeable insert of claim 1, wherein the insert body further comprises a second compartment connected to the first compartment, wherein the second compartment is configured to contain a portion of a bolt that passes through the first compartment.

3. The interchangeable insert of claim 2, wherein a width of the first compartment is greater than a width of the second compartment.

4. The interchangeable insert of claim 3, wherein a portion of the second compartment supports the tray within the first compartment.

5. The interchangeable insert of claim 2, wherein an interior of an end of the second compartment disposed away from the first compartment has a concave curve.

6. The interchangeable insert of claim 2, wherein the tray further comprises a second tray opening, wherein the second tray opening is located at a bottom of the tray and opposite the first tray opening and wherein the second tray opening is configured to allow a portion of a bolt to pass through the tray into the second compartment.

7. The interchangeable insert of claim 1, wherein the tray further comprises a side opening configured to allow a threaded nut to enter an interior of the tray.

8. The interchangeable insert of claim 1, wherein the tray further comprises an alignment protrusion, wherein the alignment protrusion fits within a groove located in the insert body first compartment.

9. The interchangeable insert of claim 1, wherein the tray is configured to cover a majority of a top and a bottom surface of a threaded nut that is contained within the tray interior space.

10. The interchangeable insert of claim 1, wherein the door is attached to the insert body through a hinge, and wherein the door includes an opening.

11. The interchangeable insert of claim 1, wherein the door includes a projection configured to extend into the insert body first compartment toward the tray, wherein the projection is configured to restrict movement of the tray in at least one direction within the insert body first compartment.

12. The interchangeable insert of claim 1, wherein the insert body first compartment further comprises a slot configured to hold a washer adjacent to an interior portion of the top wall.

13. The interchangeable insert of claim 1, wherein the side of the insert body with the second opening is oriented at a draft angle relative to the top wall of the insert body.

14. The interchangeable insert of claim 1, wherein side walk of the insert body are oriented at draft angles relative to the side of the insert body with the second opening.

15. The interchangeable insert of claim 1, wherein the first size threaded nut is a three-eighths inch square nut and the second size threaded nut is a one-half inch square nut.

16. An interchangeable insert comprising:
   a tray comprising:
   a tray interior space configured to contain a first size of a threaded nut; and
   a first tray opening located at a top of the tray, wherein the first tray opening is configured to allow a portion of a bolt into the tray interior space; and
   an insert body designed to be included in an enclosure, wherein the insert body comprises:
   a first compartment configured to securely contain the tray, wherein the first compartment is configured to contain a second size of a threaded nut without the tray, wherein the first size threaded nut is smaller than the second size threaded nut;
   a top wall with a first opening providing access to the first compartment, wherein the first opening is configured to allow a portion of a bolt into the first compartment;
   a second opening in a side of the insert body, wherein the second opening is configured to allow the tray to enter the first compartment after the insert body is included in the enclosure; and
   wherein the insert body further comprises a ridge adjacent to the top wall, wherein the ridge extends outwards from the first compartment on a plurality of sides of the insert body.

17. An interchangeable insert comprising:
   a tray comprising:
   a tray interior space configured to contain a first size of a threaded nut; and
   a first tray opening located at a top of the tray, wherein the first tray opening is configured to allow a portion of a bolt into the tray interior space; and
   an insert body designed to be included in an enclosure, wherein the insert body comprises:
   a first compartment configured to securely contain the tray, wherein the first compartment is configured to contain a second size of a threaded nut without the tray, wherein the first size threaded nut is smaller than the second size threaded nut;
   a top wall with a first opening providing access to the first compartment, wherein the first opening is configured to allow a portion of a bolt into the first compartment;
   a second opening in a side of the insert body, wherein the second opening is configured to allow the tray to enter the first compartment after the insert body is included in the enclosure; and
   wherein the insert body further comprises a collar surrounding the first opening, wherein the collar extends from an exterior portion of the top wall.

* * * * *